US012706667B2

(12) United States Patent
Chen et al.

(10) Patent No.: US 12,706,667 B2
(45) Date of Patent: Aug. 11, 2026

(54) METHOD FOR DETERMINING PERFORMANCE INDICATOR, DEVICE AND COMPUTER STORAGE MEDIUM

(71) Applicants: CHINA MOBILE GROUP DESIGN INSTITUTE CO., LTD., Beijing (CN); CHINA MOBILE COMMUNICATIONS GROUP CO., LTD., Beijing (CN)

(72) Inventors: Xiaoming Chen, Beijing (CN); Junshi Gao, Beijing (CN); Xiaoqing Zhu, Beijing (CN); Tianpu Yang, Beijing (CN); Zhifei Tang, Beijing (CN); Jiameng Wang, Beijing (CN); Wenjing Yu, Beijing (CN)

(73) Assignees: China Mobile Group Design Institute Co., LTD., Beijing (CN); China Mobile Communications Group Co., LTD., Beijing (CN)

( * ) Notice: Subject to any disclaimer, the term of this patent is extended or adjusted under 35 U.S.C. 154(b) by 241 days.

(21) Appl. No.: 18/686,482

(22) PCT Filed: Jan. 30, 2023

(86) PCT No.: PCT/CN2023/073873

§ 371 (c)(1),
(2) Date: Feb. 26, 2024

(87) PCT Pub. No.: WO2024/066148

PCT Pub. Date: Apr. 4, 2024

(65) Prior Publication Data

US 2025/0125870 A1 Apr. 17, 2025

(30) Foreign Application Priority Data

Sep. 27, 2022 (CN) ........................ 202211183089.0

(51) Int. Cl.
*H04B 10/073* (2013.01)

(52) U.S. Cl.
CPC ................................ *H04B 10/0731* (2013.01)

(58) Field of Classification Search
CPC ................................................. H04B 10/0731
(Continued)

(56) References Cited

U.S. PATENT DOCUMENTS 11,309,960 B2 * 4/2022 Flettner et al. .. H04B 10/07953
11,595,125 B2 * 2/2023 He et al. .......... H04B 10/07953
(Continued)

FOREIGN PATENT DOCUMENTS

CN 104471869 A 3/2015
CN 114499679 A 5/2022

OTHER PUBLICATIONS

International Search Report for corresponding PCT/CN2023/073873, mailed May 31, 2023, 21 pages. (Chinese and English Language).
(Continued)

*Primary Examiner* — Kenneth N Vanderpuye
(74) *Attorney, Agent, or Firm* — Maginot, Moore & Beck, LLP

(57) ABSTRACT

A method for determining a performance indicator is performed by an electronic device. The method includes: obtaining a first test result by testing preset indicators of a repeated Open Cable system in a first test environment, and obtaining a second test result by testing the preset indicators of the repeated Open Cable system in a second test environment, in which the preset indicators include a quality factor Q value and a linear signal noise ratio (SNR); determining an external SNR value of the system based on the first test result and the second test result; and determining an intrinsic SNR value of the system based on the external SNR
(Continued)

obtaining a first test result by testing preset indicators of the relay open communication system in the first test environment and obtaining a second test result by testing preset indicators of the relay open cable system in the second test environment — 100 determining an external SNR value of the system based on the first test result and the second test result — 101 determining an intrinsic SNR value of the system based on the external SNR value, the obtained linear SNR, the nonlinear SNR, and the GAWBS SNR — 102 value, the linear SNR, a nonlinear SNR, and a guided acousto-optic wave Brillouin scattering (GAWBS) SNR.

18 Claims, 3 Drawing Sheets

(58) Field of Classification Search
USPC ........................................................... 398/16
See application file for complete search history.

(56) References Cited

U.S. PATENT DOCUMENTS

| | | | |
|---|---|---|---|
| 2020/0412448 | A1 | 12/2020 | Flettner et al. |
| 2021/0203415 | A1 | 7/2021 | Slovak et al. |
| 2021/0273722 | A1 | 9/2021 | He et al. |

OTHER PUBLICATIONS

Ye, Yin and Liu, Jie, "Key performance indexes and verification of open submarine cable system," Guangdong Communication Technology, Academic Journal Electronic Publishing House, http://www.cnki.net, 2021, DOI:10.3969/j.issn.1006-6403.2021.09.017.
Office Action for corresponding CN 202211183089.0, mailed Feb. 7, 2024, 15 pages. (Chinese and English Language).
Pecci et al., Experimental Characterization of Submarine Open Cable Using Gaussian-Noise Model and OSNR WET Parameter, Optical Fiber Communications Conference and Exhibition, IEEE Explore, 2017, pp. 1-4.

* cited by examiner

METHOD FOR DETERMINING PERFORMANCE INDICATOR, DEVICE AND COMPUTER STORAGE MEDIUM

CROSS-REFERENCE TO RELATED APPLICATIONS

This application is the U.S. National Stage Application of International Application No. PCT/CN2023/073873, filed on Jan. 30, 2023, which is based on and claims priority to Chinese Patent Application No. 202211183089.0, filed on Sep. 27, 2022, the entire contents of which are incorporated herein by reference.

TECHNICAL FIELD

The disclosure relates to a field of transmission technologies, and in particular relates to but is not limited to a method and an apparatus for determining a performance indicator, an electronic device and a computer storage medium.

BACKGROUND

Over 95% of global international data traffic is carried by international submarine cables. With the rise of global digital economy in recent years, the capacity demand for the submarine cables is growing by leaps and bounds. Due to the long international submarine cables, a repeated submarine cable system is adopted in general. That is, an optical signal is amplified by an optical amplifier arranged under the water. The optical amplifier and the submarine cable are constructed and laid simultaneously, and they are required to stably work for 25 years once laid. When the system capacity is expanded, it becomes a common means to update a submarine line terminal equipment (SLTE). In recent years, a coherent optical fiber communication technology is developed and used in the submarine cable system on a large scale. The transmission speed is continuously changed from 10G to 100G, to 200G and even to 400G. At this time, since continuous update of the SLTE is in sharp contrast with the long-term stable requirement of the underwater device, Open Cable concept is generated.

In the related art, an integrated mode is adopted when the repeated submarine cable system is constructed. That is, the SLTE and the underwater device are simultaneously constructed, and system performance testing is performed by quality factor (Q value) and an optical signal noise ratio (OSNR). However, with the application of 100G and super 100G technologies in the submarine cable system, more and more submarine cable systems are constructed using Open Cable, so that testing the Q value and the OSNR is not suitable for a submarine cable system constructed using the Open Cable. Thus, a new method for determining a performance indicator should be provided to test the system performance for repeated Open Cable systems.

SUMMARY

In a first aspect, a method for determining a performance indicator is provided according to an embodiment of the disclosure. The method includes:

obtaining a first test result by testing preset indicators of a repeated Open Cable system in a first test environment, and obtaining a second test result by testing the preset indicators of the repeated Open Cable system in a second test environment, in which the preset indicators include a Q value and a linear SNR (signal noise ratio);

determining an external SNR value of the system based on the first test result and the second test result; and determining an intrinsic SNR value of the system based on the external SNR value, the linear SNR, a nonlinear SNR, and a guided acousto-optic wave Brillouin scattering (GAWBS) SNR.

In a second aspect, an electronic device is provided according to an embodiment of the disclosure. The electronic device includes a processor, and a memory storing a computer program executable by the processor. The processor is configured to: obtain a first test result by testing preset indicators of a repeated Open Cable system in a first test environment, and obtain a second test result by testing the preset indicators of the repeated Open Cable system in a second test environment, in which the preset indicators include a Q value and a linear SNR; determine an external SNR value of the system based on the first test result and the second test result; and determine an intrinsic SNR value of the system based on the external SNR value, the linear SNR, a nonlinear SNR, and a GAWBS SNR.

In a third aspect, a computer storage medium storing a computer program is provided according to an embodiment of the disclosure. When the computer program is executed, the method for determining the performance indicator. The method includes: obtaining a first test result by testing preset indicators of a repeated Open Cable system in a first test environment, and obtaining a second test result by testing the preset indicators of the repeated Open Cable system in a second test environment, in which the preset indicators include a Q value and a linear SNR; determining an external SNR value of the system based on the first test result and the second test result; and determining an intrinsic SNR value of the system based on the external SNR value, the linear SNR, a nonlinear SNR, and a GAWBS SNR.

BRIEF DESCRIPTION OF THE DRAWINGS

In order to explain the technical solutions in the embodiments of the disclosure more clearly, the drawings described in the embodiments will be briefly introduced below. The drawings described as below are only some embodiments of the disclosure.

DETAILED DESCRIPTION

Figure 1:
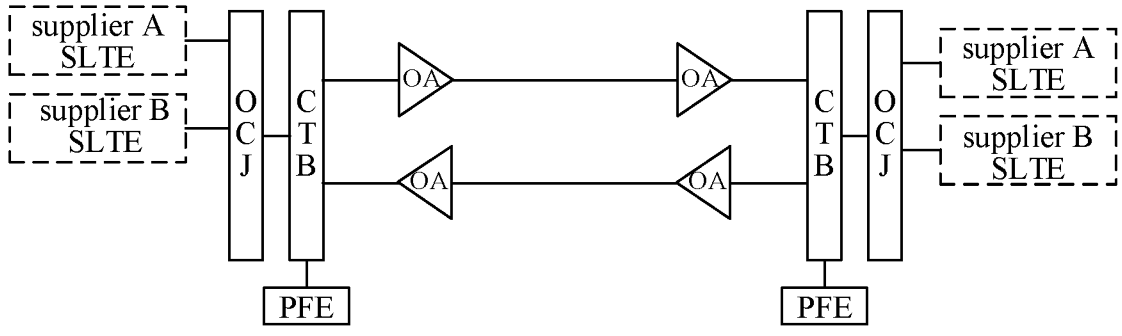
FIG. 1 is a structural diagram illustrating a repeated submarine cable system with Open Cables.

The technical solutions in the disclosure will be described clearly and completely in combination with the accompanying drawings of the disclosure.

The disclosure is further described below with reference to accompanying drawings and embodiments. It should be understood that, the embodiments provided herein are merely to explain the disclosure, rather than a limitation of the disclosure. In addition, the embodiments provided herein are configured to implement a part of embodiments of the disclosure rather than all the embodiments of the disclosure. The technical solution described in the disclosure may be implemented in any combination without conflict.

It needs to be noted that, in the disclosure, the terms "comprise/include", "comprising/including" or any other variations thereof, are intended to cover a non-exclusive inclusion, so that a method or a system including a series of elements not only includes those elements expressly listed but also includes other elements not expressly listed, or also includes elements inherent to such method or system. In the absence of more constraints, the elements defined by a sentence "comprising/including one . . . " do not preclude the presence of additional related elements (for example, steps in the method or units in the system, the units may be a part of processors, programs or software, for example) in the method or system including the elements.

The term "and/or" describes a relationship between association objects, indicating that there may be three relationships, for example, C and/or D may represent any of: existing C only, existing both C and D, or existing D only. In addition, the term "at least one" represents any combination of: any one of multiple or at least two of multiple, for example, at least one of C, D or E may represent any one or more elements selected from a set consisting of C, D, and E.

For example, the method for determining the performance indicator according to the embodiments of the disclosure includes a series of steps, but the method for determining the performance indicator according to the embodiments of the disclosure is not limited to the steps noted.

In the related art, an integrated mode is adopted when the repeated cable system is constructed. That is, the SLTE and the underwater device are constructed together, and testing the system performance is performed by testing the Q value and the OSNR. The Q value represents error bit performance of the system, as an equivalent description of a bit error ratio (BER) in the communication field. The Q value and the BER can be converted via an equation. An approximate relationship between the Q value and the BER is shown in an equation (1):

$$BER \approx \frac{1}{Q\sqrt{2\pi}}e^{-\frac{Q^2}{2}} \quad (1)$$

In general, the most significant effect of a line segment consisting of a plurality of optical amplifier segments on the transmission signal comes from the accumulation of amplifier spontaneous emission noise (ASE) of cascaded optical amplifiers. In the case where only ASE is considered, the OSNR may be expressed by an equation (2):

$$OSNR = \frac{P_{out}}{N_\lambda \cdot N_{amp} \cdot NF \cdot G \cdot hv \cdot B_r} \quad (2)$$

where $P_{out}$ is a total output power of an optical amplifier, G is a gain of the optical amplifier, NF is a noise coefficient of the optical amplifier; h is a Planck constant; v is a frequency of an optical wavelength, $B_r$ is a bandwidth of an optical channel, $N_\lambda$ is a number of wavelengths, and $N_{amp}$ is a number of optical amplifiers. It should be noted that, the Q value and the OSNR may be test results obtained by testing directly on a system via an instrument.

At present, it has become an industry consensus to construct the repeated cable system according to an Open Cable mode. FIG. 1 is a structural diagram illustrating a repeated submarine cable system with Open Cables. As illustrated in FIG. 1, the system is separately constructed with SLTEs of different suppliers (corresponding to a supplier A and a supplier B in the drawing) at a transmitting end and a receiving end. Simultaneously, an underwater device is also constructed, including an optical coupling junction (OCJ), a power feeding equipment (PFE), a cable terminating box (CTB), a submarine optical cable and an optical amplifier (OA). An interaction process of the above devices is described herein. The SLTE possesses a multiplexing and demultiplexing function and a wavelength conversion function, so that multi-channel optical signals may be converged into a pair of optical fibers. The OCJ has multiple interfaces that may get access to SLTEs with different wavelength ranges from multiple manufacturers (corresponding to SLTEs of the supplier A and the supplier B), and the OCJ is connected to the CTB, so that the optical signals are first transmitted to submarine cables, then amplified by the OA, and finally transmitted to an opposite device. The PFE is connected to a cable interface of the CTB for supplying powers to the CTB and the OA.

It is found that the Q value and the OSNR indicator are not suitable for a submarine cable system constructed using the Open Cable mode, and the main problems are as follows:

a. The OSNR indicator does not include the influence of the nonlinear noise: with the application of 100G and super 100G technologies in the submarine cable system, since a distance of a multiplexing section in the repeated submarine cable is as long as several thousand kilometers or even tens of thousands kilometers, the influence of the nonlinear noise is large, the OSNR indicator only includes ASE noise while does not include nonlinear noise, and the nonlinear noise increases as the OSNR increases, which reduces the system performance.

b. The Q value may not reflect the system performance: the Q value is not only related to a processing capability of a dense wavelength division multiplexing (DWDM) device, but also decreases as the OSNR increases due to the influence of the nonlinear noise after passing through the submarine cable system.

Nowadays, submarine cable systems constructed using the Open Cable mode are increasing, and the system performance cannot be accurately estimated only using the OSNR including ASE noise and the Q value. With respect to the above problem, a generalized signal noise ratio (GSNR) indicator is introduced in the international telecommunication union (ITU) standard G.977.1. The GSNR indicator considers the influences of noises such as nonlinear interference (NLI) and guided acousto-optic wave Brillouin scattering (GAWBS) in addition to the ASE noise. It can be seen that the GSNR indicator includes the influences of both the linear noise and the non-linear noise. The standard has been formally published, the definition for the GSNR is as shown in an equation (3):

$$\frac{1}{GSNR} = \frac{1}{SNR_{ASE}} + \frac{1}{SNR_{NLI}} + \frac{1}{SNR_{GAWBS}} \quad (3)$$

where $SNR_{ASE}$ represents including an SNR of the ASE linear noise, $SNR_{NLI}$ represents including an SNR of the nonlinear noise including self-phase modulation (SPM) and cross-phase modulation (XPM), which may not be tested by an instrument; $SNR_{GAWBS}$ represents an SNR of the noise including guided acousto-optic wave Brillouin scattering, which is related to a length of an optical fiber and may be calculated based on correlation coefficients provided by the optical fiber manufacturer.

It needs to be noted that, the GSNR indicator is a key indicator of the submarine cable system with Open Cables. The system performance may be evaluated by testing the GSNR indicator, which may troubleshoot the hidden dangers in time, and ensure safe and reliable operations of the system. However, only a test environment of the GSNR indicator is introduced in the relevant international standard, and no specific method for testing the GSNR indicator is proposed.

With respect to the above problems, the following embodiments are proposed.

In some embodiments of the disclosure, the method for determining the performance indicator may be implemented by a processor in the electronic device. The processor may be at least one of an application specific integrated circuit (ASIC), a digital signal processor (DSP), a digital signal processing device (DSPD), a programmable logic device (PLD), a field programmable gate array (FPGA), a central processing unit (CPU), a controller, a microcontroller, or a microprocessor.

Figure 2:
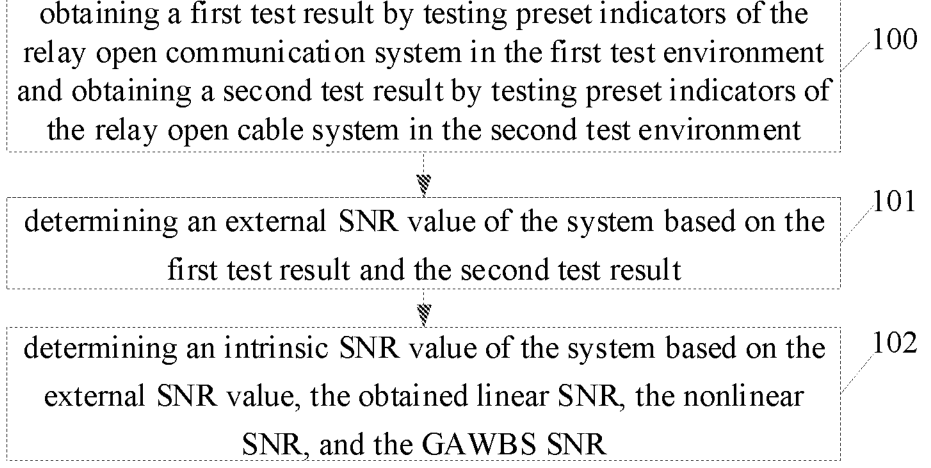
FIG. 2 is a flowchart illustrating a method for determining a performance indicator according to an embodiment of the disclosure.

FIG. 2 is a flowchart illustrating a method for determining a performance indicator according to an embodiment of the disclosure. As illustrated in FIG. 2, the flowchart may include following steps.

At 100, a first test result is obtained by testing preset indicators of a repeated Open Cable system in a first test environment and a second test result is obtained by testing preset indicators of the repeated Open Cable system in a second test environment.

In embodiments of the disclosure, the type of the repeated Open Cable system (referred to as a system hereafter) is not limited, for example, may be a repeated submarine cable system with Open Cables.

Figure 3:
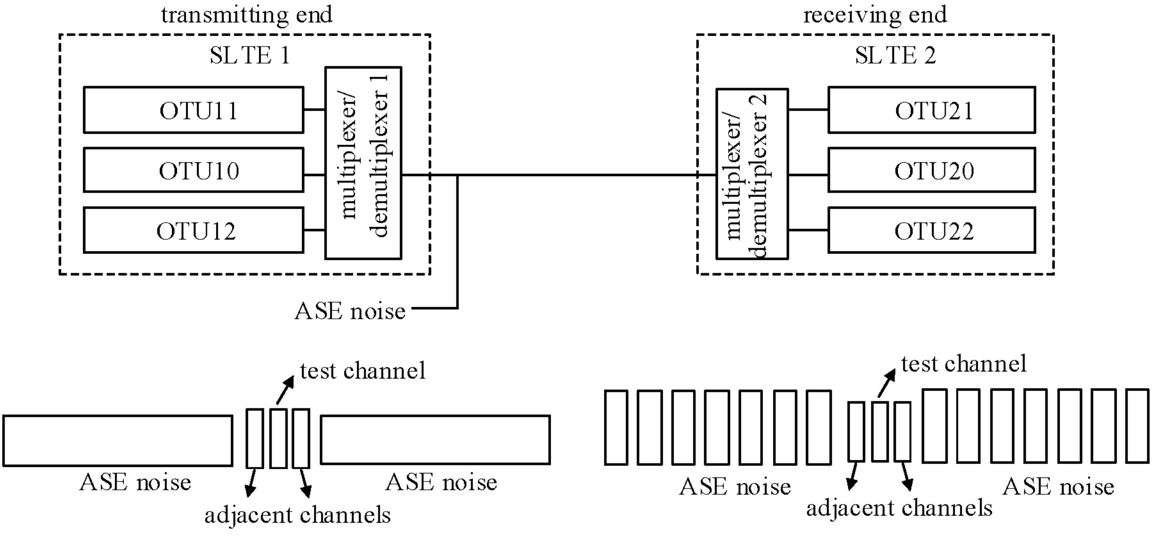
FIG. 3 is a structural diagram illustrating a generalized signal noise ratio (GSNR) test scenario according to an embodiment of the disclosure.

It needs to be noted that, for the guidance of testing a system, the ITU standard G.977.1 provides a test scenario of the GSNR indicator, as shown in FIG. 3. The method for determining the performance indicator according to the embodiments of the disclosure is described below with reference to the test scenario shown in FIG. 3.

For example, referring to FIG. 3, the system may include a transmitting end and a receiving end. The transmitting end and the receiving end transmit optical signals via N optical channels, where N is a value greater than or equal to 3.

The transmitting end includes an SLTE 1 and a multiplexer/demultiplexer 1, and the receiving end includes an SLTE 2 and a multiplexer/demultiplexer 2. Optical transform units (OTUs) are configured in the SLTE 1 and the SLTE 2.

When the construction of the system is completed, the OTUs are not configured in the system. In order to enable testing of the GSNR, when an acceptance test of the system is performed, the same SLTE for testing needs to be mounted at the transmitting end and the receiving end, respectively and the OTUs need to be configured on the SLTE by using three adjacent optical channels selected from N optical channels. The OTUs configured on the SLTE of the transmitting end correspond to an OTU10, an OTU11, and an OTU12 in the Figure, respectively. The OTUs configured on the SLTE of the receiving end correspond to an OTU20, an OTU21, and an OTU22 in the Figure, respectively.

An intermediate channel among the three adjacent optical channels is a test channel, the two remaining optical channels are the adjacent channels, and other channels than the three adjacent optical channels are idle channels. For each idle channel, ASE noise may be loaded by an instrument such as a spectrometer, and an interval of each optical channel is a 1.15 times Baud rate. The main function of the multiplexer is to combine wavelengths of optical signals of a plurality of optical channels at the transmitting end and transmit the same in one optical fiber; the main function of the demultiplexer is to separate the wavelengths of the optical signals of the plurality of optical channels transmitted in one optical fiber at the receiving end.

For example, the above OTUs adopt a modulation format of quadrature phase shift keying (QPSK) or 16 quadrature amplitude modulation (16QAM). The way for configuring the above OTUs may adopt a way of mounting an OTU board or other ways, which will not be limited in the embodiments of the disclosure. It needs to be noted that, the above OTUs are mounted to test the GSNR indicator. Therefore, after the acceptance test of the system ends, the mounted OTUs may be removed.

For example, on the basis of the test scenario as shown in FIG. 3, a first test environment and a second test result may be preconfigured. The first test environment represents an environment where the transmitting end and the receiving end are connected via a tail fiber with a length less than a set value; and the second test environment represents an environment where the transmitting end and the receiving end are connected via an actual transmission line.

The tail fiber with the length less than the set value is called a short tail fiber. The range of the set value may be from 10 m to 30 m. Preferably, the set value may be 10 m. That is, there is only a short fiber connection (for example, 3 m or 5 m) between the transmitting end and the receiving end, while there are no long-distance fiber transmission (several hundred km or several thousand km) is performed. For example, the first test environment may be directly connecting the transmitting end and the receiving end via the short tail fiber in the laboratory.

For example, the actual transmission line in the second test environment indicates an optical cable transmission line that has been constructed, that is, the second test environment is a test environment where the transmitting end and the receiving end are connected to the optical cable transmission line that has been constructed.

In the embodiments of the disclosure, after the first test environment and the second test environment are configured, a first test result may be obtained by testing the preset indicators of the repeated Open Cable system in the first test environment and a second test result may be obtained by testing the preset indicators of the repeated Open Cable system in the second test environment, which may include: testing the preset indicators of the system in the first test environment by adjusting an optical channel power of the test channel for at least three times to obtain at least three sets of indicator data in the first test environment, and testing the preset indicators of the system in the second test environment by adjusting the optical channel power of the test channel for at least three times to obtain at least three sets of indicator data in the second test environment; and determining the at least three sets of indicator data obtained in the first test environment as the first test result, and determining the at least three sets of indicator data obtained in the second test environment as the second test result.

The preset indicators of the system include a quality factor Q value and a linear SNR. In the first test environment, by adjusting an optical channel power of the test channel for at least three times, the Q value and the linear SNR of the system are tested to obtain at least three sets of indicator data. Each set of indicator data is obtained for each adjustment of the optical channel power of the test channel. The set of indicator data include the Q value and the linear SNR value. That is, at least three sets of indicator data are obtained by adjusting the optical channel power of the test channel for more than three times. Then, the at least three sets of indicator data obtained in the first test environment are determined as the first test result, and the at least three sets of indicator data obtained in the second test environment are determined as the second test result. Each set of indicator data may be directly tested by an instrument such as a spectrometer.

For example, when each set of indicator data are obtained, a corresponding optical channel power may be further obtained. Since the optical channel power for the test channel needs to be used in a subsequent curve fitting process, please refer to the section of subsequent curve fitting.

At step 101, an external SNR value of the system is determined based on the first test result and the second test result.

For example, an implementation of determining the external SNR value of the system based on the first test result and the second test result may include: determining a first test curve based on the first test result; determining a second test curve based on the second test result; and determining the external SNR value of the system based on the first test curve and the second test curve.

For example, after the first test result is obtained, a curve is drawn by taking a linear SNR value of each set of indicator data included in the first test result as a horizontal axis and a square of the Q value of each set of indicator data as a longitudinal coordinate, to obtain a first test curve. The first test curve, also referred to as a back-to-back performance curve, is used to represent a corresponding relationship between the Q value of the system and the linear SNR in the first test environment.

For example, after the second test result is obtained, a curve is drawn by taking a linear SNR value of each set of indicator data included in the second test result as a horizontal axis and a square of the Q value of each set of indicator data as a longitudinal coordinate, to obtain a second test curve. The second test curve, also referred to as an actual performance curve, is used to represent a corresponding relationship between the Q value of the system and the linear SNR in the second test environment.

Figure 4:
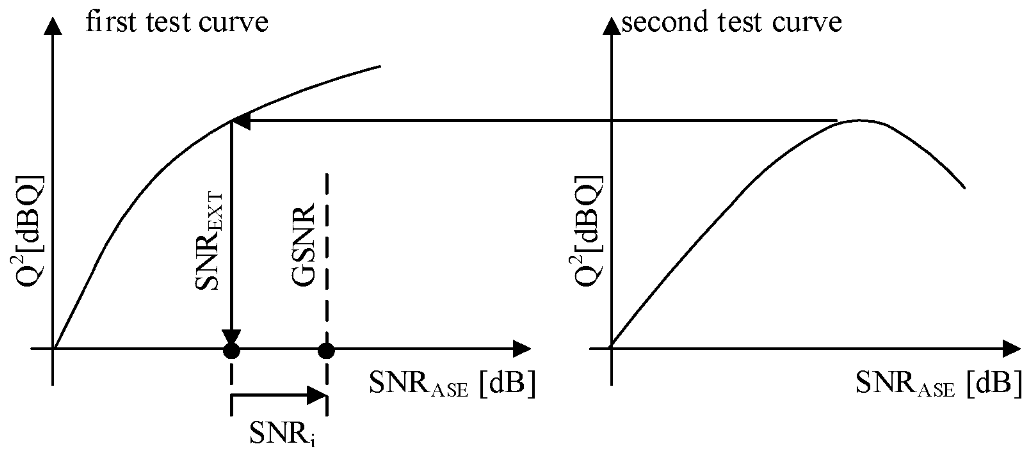
FIG. 4 is a result diagram illustrating corresponding test curves obtained by testing in two test environments according to an embodiment of the disclosure.

It may be understood that the first test curve and the second test curve differ in the test environment, and a process of determining the first test curve is same as a process of determining the second test curve. The process of obtaining the first test curve and the second test curve is illustrated in FIG. 4.

For example, due to a short optical fiber in the first test environment, the NLI of the optical fiber line may be ignored. However, due to a long optical fiber in the second test environment, the NLI of the optical fiber line may be considered in a test process. FIG. 4 is a result diagram illustrating test curves obtained by testing in two test environments according to an embodiment of the disclosure. As illustrated in FIG. 4, a left diagram is a first test curve, and a right diagram is a second test curve. The horizontal coordinate axis corresponding to the first test curve or the second test curve is the linear SNR (corresponding to $SNR_{ASE}$ in the figure) in unit of dB, and the longitudinal coordinate axis is the square of the Q values (corresponding to $Q^2$ in the figure) in unit of dBQ. The Q value and the $SNR_{ASE}$ value may be directly tested by an instrument such as a spectrometer.

For example, after obtaining the first test curve and the second test curve according to the above steps, determining the external SNR value of the system based on the first test result and the second test result may include: obtaining a target Q value meeting a performance requirement on the second test curve; determining a linear SNR value corresponding to the target Q value on the first test curve; and determining the linear SNR value as the external SNR value of the system.

The external SNR value of the system corresponds to a value of $SNR_{EXT}$. The value of $SNR_{EXT}$ includes a value of noise damage $SNR_i$, and the value of $SNR_i$ corresponds to an intrinsic SNR value of the system.

For example, the target Q value meeting the performance requirement indicates that the target Q value is greater than a set threshold. There may be a plurality of target Q values, for example, three or above. The set threshold may be configured based on actual situations, which is not limited in the embodiments of the disclosure.

It may be understood that, the reason why the plurality of target Q values are obtained on the second test curve is that, a plurality of external SNR values may be determined using the plurality of target Q values, so that curve fitting may be performed using the plurality of external SNR values in the subsequent curve fitting process, thereby ensuring the accuracy of the fitted curve.

Taking obtaining one of the target Q values as an example, the process of determining the external SNR value is illustrated. Referring to FIG. 4, after the first test curve and the second test curve are determined, a longitudinal coordinate value of a peak of the second test curve may be taken as a target Q value. In this case, the target Q value corresponds to a Q value with an optimal system performance. After the target Q value is obtained, the target Q value is mapped to the first test curve to obtain a linear SNR value (i.e., a value of $SNR_{ASE}$) corresponding to the target Q value is obtained, and the $SNR_{ASE}$ value is determined as a value of the $SNR_{EXT}$.

A relationship between the $SNR_{EXT}$ and the GSNR is shown in an equation (4):

$$\frac{1}{SNR_{EXT}} = \frac{1}{GSNR} + \frac{1}{SNR_i} \tag{4}$$

$SNR_i$ indicate the noises introduced by various factors including various polarization dependent losses and chromatic dispersion. For a fixed repeated Open Cable system, $SNR_i$ is a constant while G.977.1 does not provide a standard method for testing the $SNR_i$. With respect to the problem, according to the relevant equations in G.977.1 that are applied in subsequent steps of the embodiments of the disclosure, and the equations for other related indicators, a method for testing and calculating the $SNR_i$ may be provided, testing the GSNR indicator of the system may be thus achieved.

At step 102, an intrinsic SNR value of the system is determined based on the external SNR value, the obtained linear SNR, the nonlinear SNR, and the GAWBS SNR.

In some embodiments, determining the intrinsic SNR value of the system based on the external SNR value, the obtained linear SNR, the nonlinear SNR, and the GAWBS SNR may include: determining a first corresponding relationship among a GSNR indicator, the linear SNR, the nonlinear SNR, and the GAWBS SNR; determining a second corresponding relationship among the external SNR value, the GSNR indicator and the intrinsic SNR value of the system; and determining the intrinsic SNR value of the system based on the first corresponding relationship and the second corresponding relationship.

The linear SNR corresponds to the $SNR_{ASE}$, the nonlinear SNR corresponds to the $SNR_{NLI}$, the GAWBS SNR corresponds to the $SNR_{GAWBS}$. For example, according to the above contents, the corresponding relationship among the GSNR indicator, the $SNR_{ASE}$, the $SNR_{NLI}$ and the $SNR_{GAWBS}$ is given in the ITU-T standard G.977.1, which may refer to the above equation (3). That is, the equation (3) represents the first corresponding relationship among the GSNR indicator, the linear SNR, the nonlinear SNR, and the GAWBS SNR.

For example, the intrinsic SNR of the system corresponds to the above $SNR_i$. Based on the above content, the corresponding relationship among the $SNR_{ASE}$, the GSNR indicator and the $SNR_i$ may refer to the above equation (4). That is, the equation (4) represents the second corresponding relationship among the external SNR value, the GSNR indicator and the intrinsic SNR value of the system.

In some embodiments, after the first corresponding relationship and the second corresponding relationship are obtained, determining the intrinsic SNR value of the system based on the first corresponding relationship and the second corresponding relationship includes: obtaining a target curve by performing curve fitting on the first corresponding relationship and the second corresponding relationship; and determining the intrinsic SNR value of the system based on an intersection point between the target curve and a longitudinal coordinate axis.

For example, obtaining the target curve by performing the curve fitting on the first corresponding relationship and the second corresponding relationship may include: obtaining a processed corresponding relationship by combining the first corresponding relationship and the second corresponding relationship; and obtaining the target curve, by performing curve fitting on the processed corresponding relationship using a linear equation with one unknown.

Combining the first corresponding relationship and the second corresponding relationship means that the equation (3) and the equation (4) are combined. The equation (3) and the equation (4) may be combined to obtain an equation (5):

$$\frac{1}{SNR_{EXT}} = \frac{1}{GSNR} + \frac{1}{SNR_i} = \frac{1}{SNR_{ASE}} + \frac{1}{SNR_{NLI}} + \frac{1}{SNR_{GAWBS}} + \frac{1}{SNR_i} \quad (5)$$

The equation (5) may be further deduced to obtain an equation (6):

$$\frac{1}{SNR_{EXT}} - \frac{1}{SNR_{ASE}} = \frac{1}{SNR_{NLI}} + \frac{1}{SNR_{GAWBS}} + \frac{1}{SNR_i} \quad (6)$$

For example, the equation (6) represents a corresponding relationship after combining the first corresponding relationship and the second corresponding relationship, that is, the processed corresponding relationship. For example, after the processed corresponding relationship is obtained, a target curve may be obtained by performing curve fitting on the processed corresponding relationship using a linear equation with one unknown. The curve fitting process is illustrated below.

For example, according to a Gaussian noise model (GN model), a NLI noise power $P_{NLI}$ is linearly related to a 3rd order of an optical channel power $P_S$, that is, $P_{NLI}=\eta \cdot P_S^3$, where $$SNR_{NLI} = \frac{P_S}{P_{NLI}} = \frac{P_S}{\eta * P_S^3} = \frac{1}{\eta * P_S^2}.$$

Therefore, $$\frac{1}{SNR_{NLI}} \propto P_S^2$$

may be deduced.

$SNR_{GAWBS}$ is a fixed value related to a length of an optical fiber. Under the condition that the length L of the optical fiber is known, $SNR_{GAWBS}$ may be obtained by an equation (7) in combination with a GAWBS coefficient $\gamma$ of the optical fiber provided by the optical fiber manufacturer:

$$SNR_{GAWBS} = \frac{1}{\gamma * L} \quad (7)$$

In the embodiments of the disclosure, the curve fitting may be performed on the equation (6) using a linear equation with one unknown y=a*x+b, to obtain a final target curve:

$$\frac{1}{SNR_{EXT}} - \frac{1}{SNR_{ASE}} = a * P_S^2 + \frac{1}{SNR_{GAWBS}} + \frac{1}{SNR_i},$$

where $\frac{1}{SNR_{EXT}} - \frac{1}{SNR_{ASE}}$ is a y-axis variable, a is a slope, $P_S^2$ is an x-axis variable, constant $$b = \frac{1}{SNR_{GAWBS}} + \frac{1}{SNR_i}.$$

Figure 5:
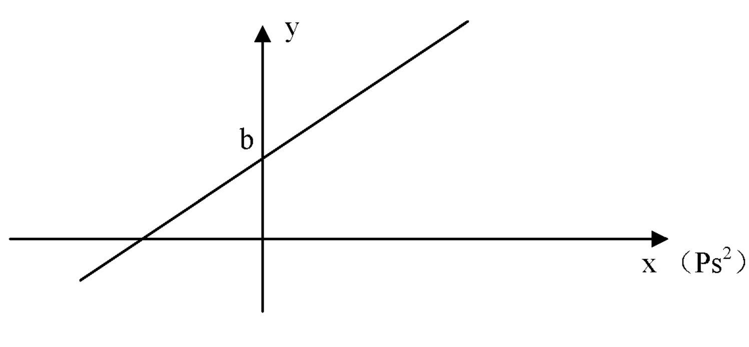
FIG. 5 is a result diagram illustrating a target curve according to an embodiment of the present disclosure.

In some embodiments, after the target curve is obtained, the intrinsic SNR value of the system is determined based on an intersection point between the target curve and the longitudinal coordinate axis. For example, a series of values obtained at the above test steps, such as the value of $SNR_{ASE}$, the value of the optical channel power $P_S$, the value of $SNR_{EXT}$ and the value of $SNR_{GAWBS}$ calculated according to the equation (7), are input into the equation (6) to draw coordinate points in a two-dimensional coordinate system, to obtain a target curve, see FIG. 5.

According to the equation (6), $$b = \frac{1}{SNR_{GAWBS}} + \frac{1}{SNR_i}.$$

That is, the intersection point between the target curve and the longitudinal coordinate axis is the value of the constant b. Since $SNR_{GAWBS}$ is a constant that has been calculated according to the equation (7), the value of $SNR_i$ may be then calculated, that is, the intrinsic SNR value of the system.

For example, after determining the intrinsic SNR value of the system, the method may further include: testing the GSNR indicator based on the intrinsic SNR value of the system and the second corresponding relationship.

It needs to be noted that, after the value of $SNR_i$ is obtained, and the $SNR_{EXT}$ has been calculated in the above steps, GSNR may be thus calculated according to the second corresponding relationship represented by the equation (4), thereby achieving the testing of the GSNR indicator.

The method for determining a performance indicator is provided according to the embodiment of the disclosure. The method includes: obtaining the first test result by testing the preset indicators of the repeated Open Cable system in the first test environment, and obtaining the second test result by testing the preset indicators of the repeated Open Cable system in the second test environment, in which the preset indicators include the quality factor Q value and the linear SNR; determining the external SNR value of the system based on the first test result and the second test result; and determining the intrinsic SNR value of the system based on the external SNR value, the obtained linear SNR, the non-linear SNR, and the GAWBS SNR. It can be seen that the method for determining the intrinsic SNR value is provided according to the embodiments of the disclosure. The intrinsic SNR value corresponds to the value of $SNR_i$. It needs to be noted that, when the intrinsic SNR value of the system is obtained, testing the GSNR indicator may be further achieved, so that performance evaluation of the repeated Open Cable system may be achieved based on the obtained test result of the GSNR indicator. Since the standard method for testing the SNR; is not provided in the related art, the system performance evaluation may be performed only using the OSNR including the non-linear noise and the Q value in the related art. Compared with the related art, since the GSNR indicator of the disclosure simultaneously includes the influences of the linear noise and the non-linear noise, evaluating the system performance by testing the GSNR indicator may effectively enhance the accuracy of the performance evaluation, troubleshoot hidden dangers in time, and ensure safe and reliable operations of the repeated Open Cable system.

It needs to be noted that, only a test environment related to the GSNR indicator is introduced in the relevant international standard, and no explicit test and calculation method is proposed for the GSNR indicator. However, the embodiments of the disclosure provide a method for determining a performance indicator for a repeated Open Cable system, so as to determine a value of $SNR_i$ of the system. The GSNR may be accurately tested based on the equation derivation and the curve fitting. The method is characterized by an explicit process, a simple calculation and being easy to operate. The method may be adopted when the acceptance test of the Open Cable system is performed for testing. In addition, since the GSNR indicator is a key system indicator in an Open Cable mode, the performance of the repeated Open Cable system may be accurately evaluated by testing the GSNR indicator, which promotes the decoupling between the terminal device and a line equipment.

On the basis of the method for determining the performance indicator proposed in the above embodiments, an apparatus for determining a performance indicator is proposed in the embodiments of the disclosure.

Figure 6:
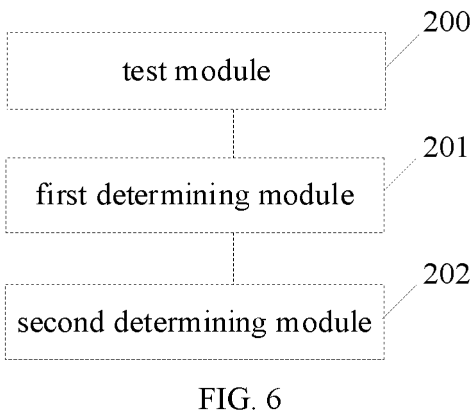
FIG. 6 is a structural diagram illustrating a composition of an apparatus for determining a performance indicator according to an embodiment of the disclosure.

FIG. 6 is a structural diagram illustrating a composition of an apparatus for determining a performance indicator according to an embodiment of the disclosure. The apparatus may include a test module 200, a first determining module 201 and a second determining module 202.

The test module 200 is configured to obtain a first test result by testing preset indicators of a repeated Open Cable system in a first test environment, and obtain a second test result by testing the preset indicators of the repeated Open Cable system in a second test environment. The preset indicators include a quality factor Q value and a linear SNR.

The first determining module 201 is configured to determine an external SNR value of the system based on the first test result and the second test result.

The second determining module 202 is configured to determine an intrinsic SNR value of the system based on the external SNR value, the obtained linear SNR, a nonlinear SNR, and a GAWBS SNR.

In some embodiments, the system includes a transmitting end and a receiving end, the first test environment represents an environment where the transmitting end and the receiving end are connected via a tail fiber with a length less than a set value; and the second test environment represents an environment where the transmitting end and the receiving end are connected via an actual transmission line.

In some embodiments, the first determining module 201 is further configured to:

determine a first test curve based on the first test result, in which the first test curve is configured to represent a corresponding relationship between Q values and linear SNRs of the system in the first test environment;

determine a second test curve based on the second test result, in which the second test curve is configured to represent a corresponding relationship between Q values and linear SNRs of the system in the second test environment; and determine the external SNR value of the system based on the first test curve and the second test curve.

In some embodiments, the first determining module 201 is further configured to:

obtain a target Q value meeting a performance requirement on the second test curve;

determine a linear SNR value corresponding to the target Q value on the first test curve; and determine the linear SNR value as the external SNR value of the system.

In some embodiments, the second determining module 202 is further configured to:

determine a first corresponding relationship among a GSNR indicator, the linear SNR, the nonlinear SNR, and the GAWBS SNR;

determine a second corresponding relationship among the external SNR value, the GSNR indicator and the intrinsic SNR value of the system; and determine the intrinsic SNR value of the system based on the first corresponding relationship and the second corresponding relationship.

In some embodiments, the second determining module 202 is further configured to:

obtain a target curve by performing curve fitting on the first corresponding relationship and the second corresponding relationship; and determine the intrinsic SNR value of the system based on an intersection point between the target curve and a longitudinal coordinate axis.

In some embodiments, the second determining module 202 is further configured to:

obtain a processed corresponding relationship by combining the first corresponding relationship and the second corresponding relationship; and obtain the target curve, by performing curve fitting on the processed corresponding relationship using a linear equation with one unknown.

In some embodiments, after determining the intrinsic SNR value of the system, the second determining module 202 is further configured to:

test the GSNR indicator based on the intrinsic SNR value of the system and the second corresponding relationship.

In some embodiments, the transmitting end and the receiving end transmit an optical signal via N optical channels, N being an integer greater than or equal to 3. The test module 200 is further configured to:

select and determine a test channel from the N optical channels;

correspondingly, when obtaining the first test result by testing the preset indicators of repeated Open Cable system in the first test environment and obtaining the second test result by testing the preset indicators of the repeated Open Cable system in the second test environment, the test module 200 is configured to:

test the preset indicators of the system in the first test environment by adjusting an optical channel power of the test channel for at least three times, to obtain at least three sets of indicator data in the first test environment, and test the preset indicators of the system in the second test environment by adjusting the optical channel power of the test channel for at least three times, to obtain at least three sets of indicator data in the second test environment; in which each set of indicator data includes a Q value and a linear SNR value; and determine the at least three sets of indicator data obtained in the first test environment as the first test result, and determine the at least three sets of indicator data obtained in the second test environment as the second test result.

In actual applications, the above test module 200, the first determining module 201 and the second determining module 202 may be implemented by a processor located in an electronic device. The processor may be at least one of an ASIC, a DSP, a DSPD, a PLD, an FPGA, a CPU, a controller, a microcontroller or a microprocessor.

Specifically, computer program instructions corresponding to the method for determining the performance indicator proposed in the above embodiments, may be stored on a computer medium such as an optical disc, a hard disc or a usb flash disc. When the computer program instructions corresponding to the method for determining the performance indicator in the storage medium are read or executed by the electronic device, the method for determining the performance indicator in any one of the foregoing embodiments is implemented.

Figure 7:
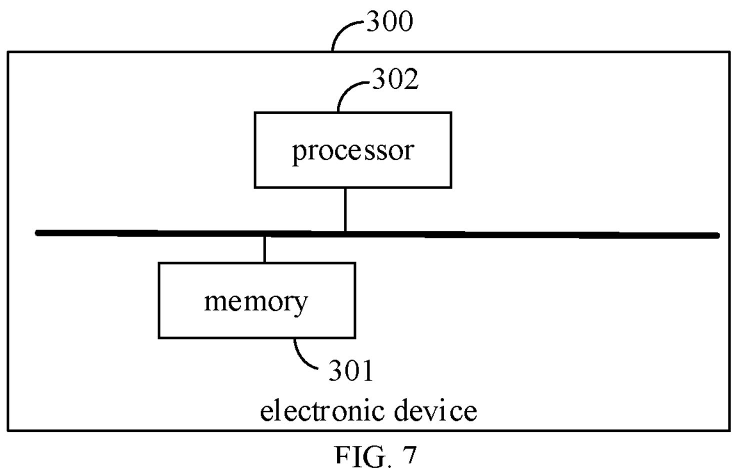
FIG. 7 is a structural diagram illustrating an electronic device according to an embodiment of the disclosure.

Based on the same technical concept of the forgoing embodiments, FIG. 7 illustrates an electronic device 300 according to an embodiment of the disclosure. The electronic device 300 may include a memory 301 and a processor 302.

The memory 301 is configured to store a computer program and data.

The processor 302 is configured to execute a computer program stored in the memory, to implement the method for determining performance indicator in any one of the forgoing embodiments.

In actual applications, the memory 301 may be a volatile memory, such as a RAM; or a non-volatile memory, such as a ROM, a flash memory, a hard disk drive (HDD), or a solid-state drive (SSD); or a combination of the above types of memories, and the memory 301 may provide instructions and data to the processor 302.

The processor 302 may be at least one of an ASIC, a DSP, a DSPD, a PLD, an FPGA, a CPU, a controller, a microcontroller or a microprocessor. It may be understood that, for different repeated Open Cable systems, there may be other electronic devices configured to implement the functions of the above processor, which will not be limited in the embodiments of the disclosure. In some embodiments, the functions of the system according to the embodiments of the disclosure may be configured to perform the method described in the above embodiments, and the implementation may refer to descriptions of the above method embodiments, which will not be repeated for conciseness.

The description of the above embodiments tends to emphasize differences among the embodiments, and the similar/same description may be referred to each other, which will not be repeated for conciseness. The methods disclosed in the method embodiments according to the disclosure may be arbitrarily combined without conflict to obtain new method embodiments. Features disclosed in the product embodiments according to the disclosure may be arbitrarily combined without conflict to obtain new product embodiments. Features disclosed in the method embodiments or the device embodiments according to the disclosure may be arbitrarily combined without conflict to obtain new method embodiments or device embodiments.

Those skilled in the art shall understand that the embodiments in the disclosure may be provided as methods, apparatus, or computer program products. Therefore, the disclosure may adopt the form of a hardware embodiment, a software embodiment, or an embodiment combining the software and the hardware. Further, the disclosure may adopt a form of a computer program product implemented on one or more computer available storage media (including but not limited to a disk memory and an optical memory) including computer available program codes.

The disclosure is described with reference to flowcharts and/or block diagrams of the methods, the devices (systems), and the computer program products according to the embodiments of the disclosure. It should be understood that each process and/or block in the flowchart and/or the block diagram, and a combination of the process and/or the block in the flowchart and/or the block diagram, may be implemented by computer program instructions. The computer program instructions may be provided to a processor of a general-purpose computer, a dedicated computer, an embedded processor, or other programmable data processing devices to produce a machine such that the instructions executed by the processor of the computer or other programmable data processing devices may produce a system for implementing the functions specified in one or more processes of the flowchart diagram and/or one or more blocks of the block diagram.

The computer program instructions may be loaded onto a computer or other programmable data processing devices, such that a series of operation steps are performed on the computer or the other programmable devices to produce processes implemented by the computer such that the instructions executed on the computer or the other programmable devices provide the steps of functions specified in one or more processes of the flowchart diagram and/or in one or more blocks of the block diagram.

The forgoing are only preferred embodiments in the disclosure, and are not used to limit the protection scope of the disclosure.

What is claimed is:

1. A method for determining a performance indicator, performed by an electronic device, the method comprising:

obtaining a first test result by testing preset indicators of a repeated Open Cable system in a first test environment, and obtaining a second test result by testing the preset indicators of the repeated Open Cable system in a second test environment, wherein the preset indicators comprise a quality factor Q value and a linear signal noise ratio (SNR);

determining an external SNR value of the system based on the first test result and the second test result; and determining an intrinsic SNR value of the system based on the external SNR value, the linear SNR, a nonlinear SNR, and a guided acousto-optic wave Brillouin scattering (GAWBS) SNR.

2. The method according to claim 1, wherein determining the external SNR value of the system based on the first test result and the second test result comprises:

determining a first test curve based on the first test result, wherein the first test curve is configured to represent a corresponding relationship between Q values and linear SNRs of the system in the first test environment;

determining a second test curve based on the second test result, wherein the second test curve is configured to represent a corresponding relationship between Q values and linear SNRs of the system in the second test environment; and determining the external SNR value of the system based on the first test curve and the second test curve.

3. The method according to claim 2, wherein determining the external SNR value of the system based on the first test curve and the second test curve comprises:

obtaining a target Q value meeting a performance requirement on the second test curve;

determining a target linear SNR value corresponding to the target Q value on the first test curve; and determining the target linear SNR value as the external SNR value of the system.

4. The method according to claim 1, wherein determining the intrinsic SNR value of the system based on the external SNR value, the linear SNR, the nonlinear SNR, and the GAWBS SNR comprises:

determining a first corresponding relationship among a generalized signal noise ratio (GSNR) indicator, the linear SNR, the nonlinear SNR, and the GAWBS SNR;

determining a second corresponding relationship among the external SNR value, the GSNR indicator and the intrinsic SNR value of the system; and determining the intrinsic SNR value of the system based on the first corresponding relationship and the second corresponding relationship.

5. The method according to claim 4, wherein determining the intrinsic SNR value of the system based on the first corresponding relationship and the second corresponding relationship comprises:

obtaining a target curve by performing curve fitting on the first corresponding relationship and the second corresponding relationship; and determining the intrinsic SNR value of the system based on an intersection point between the target curve and a longitudinal coordinate axis.

6. The method according to claim 5, wherein obtaining the target curve by performing the curve fitting on the first corresponding relationship and the second corresponding relationship comprises:

obtaining a processed corresponding relationship by combining the first corresponding relationship and the second corresponding relationship; and obtaining the target curve, by performing curve fitting on the processed corresponding relationship using a linear equation with one unknown.

7. The method according to claim 4, wherein after determining the intrinsic SNR value of the system, the method further comprises:

obtaining the GSNR indicator based on the intrinsic SNR value of the system and the second corresponding relationship.

8. The method according to claim 1, wherein the transmitting end and the receiving end transmit an optical signal via N optical channels, N being an integer greater than or equal to 2; and the method further comprises:

selecting and determining a test channel from the N optical channels;

wherein obtaining the first test result and the second test result comprises:

testing the preset indicators of the system in the first test environment by adjusting an optical channel power of the test channel for at least three times, to obtain at least three sets of indicator data in the first test environment, and testing the preset indicators of the system in the second test environment by adjusting the optical channel power of the test channel for at least three times, to obtain at least three sets of indicator data in the second test environment; wherein each set of indicator data comprises a Q value and a linear SNR value; and determining the at least three sets of indicator data obtained in the first test environment as the first test result, and determining the at least three sets of indicator data obtained in the second test environment as the second test result.

9. An electronic device, comprising:

a processor, and a memory storing a computer program executable by the processor, wherein the processor is configured to:

obtain a first test result by testing preset indicators of a repeated Open Cable system in a first test environment, and obtain a second test result by testing the preset indicators of the repeated Open Cable system in a second test environment, wherein the preset indicators comprise a quality factor Q value and a linear SNR;

determine an external SNR value of the system based on the first test result and the second test result; and determine an intrinsic SNR value of the system based on the external SNR value, the linear SNR, a nonlinear SNR, and a guided acousto-optic wave Brillouin scattering (GAWBS) SNR.

10. A non-transitory computer-readable storage medium with a instructions stored thereon, wherein when the instructions are executed by a processor, a method for determining a performance indicator is implemented, the method comprising:

obtaining a first test result by testing preset indicators of a repeated Open Cable system in a first test environment, and obtaining a second test result by testing the preset indicators of the repeated Open Cable system in a second test environment, wherein the preset indicators comprise a quality factor Q value and a linear SNR;

determining an external SNR value of the system based on the first test result and the second test result; and determining an intrinsic SNR value of the system based on the external SNR value, the linear SNR, a nonlinear SNR, and a guided acousto-optic wave Brillouin scattering (GAWBS) SNR.

11. The electronic device according to claim 9, wherein the system comprises a transmitting end and a receiving end, the first test environment represents an environment where the transmitting end and the receiving end are connected via a tail fiber with a length less than a set value; and the second test environment represents an environment where the transmitting end and the receiving end are connected via an actual transmission line.

12. The electronic device according to claim 11, wherein the processor is further configured to:

determine a first test curve based on the first test result, wherein the first test curve is configured to represent a corresponding relationship between Q values and linear SNRs of the system in the first test environment;

determine a second test curve based on the second test result, wherein the second test curve is configured to represent a corresponding relationship between Q values and linear SNRs of the system in the second test environment; and determine the external SNR value of the system based on the first test curve and the second test curve.

13. The electronic device according to claim 12, wherein the processor is further configured to:

obtain a target Q value meeting a performance requirement on the second test curve;

determine a target linear SNR value corresponding to the target Q value on the first test curve; and determine the target linear SNR value as the external SNR value of the system.

14. The electronic device according to claim 9, wherein the processor is further configured to:

determine a first corresponding relationship among a generalized signal noise ratio (GSNR) indicator, the linear SNR, the nonlinear SNR, and the GAWBS SNR;

determine a second corresponding relationship among the external SNR value, the GSNR indicator and the intrinsic SNR value of the system; and determine the intrinsic SNR value of the system based on the first corresponding relationship and the second corresponding relationship.

15. The electronic device according to claim 14, wherein the processor is further configured to:

obtain a target curve by performing curve fitting on the first corresponding relationship and the second corresponding relationship; and determine the intrinsic SNR value of the system based on an intersection point between the target curve and a longitudinal coordinate axis.

16. The electronic device according to claim 15, wherein the processor is further configured to:

obtain a processed corresponding relationship by combining the first corresponding relationship and the second corresponding relationship; and obtain the target curve, by performing curve fitting on the processed corresponding relationship using a linear equation with one unknown.

17. The electronic device according to claim 12, wherein after determining the intrinsic SNR value of the system, the processor is further configured to:

obtain the GSNR indicator based on the intrinsic SNR value of the system and the second corresponding relationship.

18. The electronic device according to claim 9, wherein the transmitting end and the receiving end transmit an optical signal via N optical channels, N being an integer greater than or equal to 3;

wherein the processor is further configured to:

select a test channel from the N optical channels;

test the preset indicators of the system in the first test environment by adjusting an optical channel power of the test channel for at least three times, to obtain at least three sets of indicator data in the first test environment, and test the preset indicators of the system in the second test environment by adjusting the optical channel power of the test channel for at least three times, to obtain at least three sets of indicator data in the second test environment; wherein each set of indicator data comprises a Q value and a linear SNR value; and determine the at least three sets of indicator data obtained in the first test environment as the first test result, and determining the at least three sets of indicator data obtained in the second test environment as the second test result.

* * * * *